United States Patent
Fagundes (10) Patent No.: US 10,455,055 B2
(45) Date of Patent: Oct. 22, 2019

(54) SYSTEM AND METHOD FOR CUSTOMIZATION OF A LOCAL APPLICATION

(71) Applicant: Avaya Inc., Santa Clara, CA (US)

(72) Inventor: Luciano Godoy Fagundes, São Paulo (BR)

(73) Assignee: Avaya Inc., Santa Clara, CA (US)

( * ) Notice: Subject to any disclaimer, the term of this patent is extended or adjusted under 35 U.S.C. 154(b) by 570 days.

(21) Appl. No.: 14/746,987

(22) Filed: Jun. 23, 2015

(65) Prior Publication Data

US 2016/0294980 A1 Oct. 6, 2016

Related U.S. Application Data

(60) Provisional application No. 62/142,320, filed on Apr. 2, 2015.

(51) Int. Cl.
*G06F 15/177* (2006.01)
*H04L 29/08* (2006.01)

(52) U.S. Cl.
CPC ............ *H04L 67/34* (2013.01); *H04L 67/327* (2013.01)

(58) Field of Classification Search
CPC ... G06F 8/65; G06F 8/61; G06F 21/10; G06F 9/44536; G06F 13/385; H04L 67/34; H04L 67/327; H04L 29/08072; H04L 29/06; H04L 29/08981; G07F 19/20; H04M 2203/052
See application file for complete search history.

(56) References Cited

U.S. PATENT DOCUMENTS

| | | | | |
|---|---|---|---|---|
| 5,864,658 A | * | 1/1999 | Theobald | H04L 29/06 714/25 |
| 6,061,692 A | * | 5/2000 | Thomas | H04L 67/42 707/613 |
| 6,192,123 B1 | * | 2/2001 | Grunsted | H04M 3/42 379/201.01 |
| 7,447,766 B2 | * | 11/2008 | Motoyama | H04L 43/0811 709/203 |
| 7,647,397 B2 | * | 1/2010 | Motoyama | H04L 41/082 709/221 |
| 2002/0040374 A1 | * | 4/2002 | Kent | G06Q 30/02 715/210 |

(Continued)

*Primary Examiner* — Razu A Miah
(74) *Attorney, Agent, or Firm* — Sheridan Ross P.C.

(57) ABSTRACT

A common vendor application that can be called from multiple vendor applications is loaded onto a communication device. When the common vendor application is called from an application provided by a vendor, the common vendor application sends a request to access vendor configuration information to a common vendor server. The request includes a vendor identifier that uniquely identifies the vendor. In response to receiving the request to access the vendor configuration information, the common vendor server identifies vendor configuration information for the vendor. The vendor configuration information is sent the common vendor application on the communication device. The common vendor application uses the vendor configuration information to customize the common vendor application specific to the vendor. This allows multiple vendors to use the same common vendor application, but to have a common look-and-feel. It also reduces the number of applications necessary to support multiple vendors.

20 Claims, 4 Drawing Sheets

(56) References Cited

U.S. PATENT DOCUMENTS

| | | | | |
|---|---|---|---|---|
| 2002/0082939 A1* | 6/2002 | Clark | G06F 21/10 | 705/26.1 |
| 2003/0028826 A1* | 2/2003 | Balluff | G06F 11/2294 | 714/44 |
| 2003/0084350 A1* | 5/2003 | Eibach | H04L 63/08 | 726/4 |
| 2004/0030947 A1* | 2/2004 | Aghili | G06F 17/30899 | 714/1 |
| 2005/0010475 A1* | 1/2005 | Perkowski | G06Q 30/02 | 705/14.51 |
| 2006/0106863 A1* | 5/2006 | Ramasamy Venkatraj | G06F 11/3672 | |
| 2006/0168573 A1* | 7/2006 | Clark | G06F 8/71 | 717/140 |
| 2006/0173974 A1* | 8/2006 | Tang | H04L 63/029 | 709/217 |
| 2007/0268506 A1* | 11/2007 | Zeldin | H04L 41/0806 | 358/1.13 |
| 2007/0268515 A1* | 11/2007 | Freund | H04L 67/34 | 358/1.15 |
| 2007/0268516 A1* | 11/2007 | Bugwadia | H04L 67/34 | 358/1.15 |
| 2008/0077696 A1* | 3/2008 | Nguyen | H04L 63/029 | 709/217 |
| 2008/0098006 A1* | 4/2008 | Pedersen | H04L 67/1095 | |
| 2010/0180016 A1* | 7/2010 | Bugwadia | G06F 9/4411 | 709/220 |
| 2010/0235481 A1* | 9/2010 | Deutsch | H04L 29/12367 | 709/222 |
| 2011/0034161 A1* | 2/2011 | Kruis | H04W 4/24 | 455/419 |
| 2011/0145920 A1* | 6/2011 | Mahaffey | G06F 21/564 | 726/22 |
| 2012/0110174 A1* | 5/2012 | Wootton | G06F 21/564 | 709/224 |
| 2012/0198279 A1* | 8/2012 | Schroeder | G06F 11/2294 | 714/32 |
| 2012/0198533 A1* | 8/2012 | Thomas | G06F 17/00 | 726/7 |
| 2012/0233695 A1* | 9/2012 | Mahaffey | G06F 21/564 | 726/23 |
| 2012/0253728 A1* | 10/2012 | Chamas | G06F 11/2294 | 702/109 |
| 2013/0282662 A1* | 10/2013 | Kumarasamy | G06F 11/14 | 707/649 |
| 2014/0006129 A1* | 1/2014 | Heath | G06Q 30/0222 | 705/14.23 |
| 2014/0040444 A1* | 2/2014 | Lee | H04L 41/0806 | 709/222 |
| 2014/0189843 A1* | 7/2014 | Francisco | H04L 63/0876 | 726/9 |
| 2014/0258781 A1* | 9/2014 | Cook | G06F 11/263 | 714/32 |
| 2014/0330897 A1* | 11/2014 | Ma | G06F 17/3089 | 709/203 |
| 2015/0043377 A1* | 2/2015 | Cholas | H04W 48/08 | 370/254 |
| 2015/0271230 A1* | 9/2015 | Bostick | G06F 3/04842 | 715/738 |
| 2016/0094560 A1* | 3/2016 | Stuntebeck | H04L 63/102 | 726/1 |
| 2016/0291965 A1* | 10/2016 | Li | G06F 8/65 | |

* cited by examiner

SYSTEM AND METHOD FOR CUSTOMIZATION OF A LOCAL APPLICATION

CROSS REFERENCE TO RELATED APPLICATIONS

This application claims the benefit under 35 U.S.C. § 119(e) of U.S. Provisional Application No. 62/142,320, filed Apr. 2, 2015, entitled "SYSTEM AND METHOD FOR CLOUD-BASED CUSTOMIZATION/CONFIGURATION OF LOCAL APPS WITH MINIMUM END-USER INTERVENTION," the entire disclosure of which is incorporated herein by reference.

TECHNICAL FIELD

The systems and methods disclosed herein relate to computer applications and in particular to customization of computer applications via a network.

BACKGROUND

A common practice today is to develop an application that is specific to a company or vendor. A service provider may be required to develop multiple versions of the same application that will work with multiple applications from different vendors. In many cases, the changes to the application may only be minor changes, such as the customization of a look-and-feel. This model works fine when the number of applications is small and the changes are very minor.

However, the proliferation of the Internet has changed the number of applications in use. Today, companies are demanding applications that customers can download onto their portable devices, such as a smart phone. This trend has proliferated the number of applications being developed. As a result, the testing burden becomes increasing difficult as the number of versions of the same application proliferates into tens or hundreds of different applications. Moreover, as the number of changes to the application increases, testing costs can increase dramatically because each application has to be tested fully. Full testing of this many applications can easily become cost prohibitive.

To alleviate this problem, co-develop of applications can ease the ability to develop custom applications. However, this practice has its own set of problems, such as who owns the rights to the source code and who can legally sell or distribute the final product. If the ownership rights are not clear, neither company may be able to be able to sell or ship the application via an application store owned by a third party. As a result, only a limited number of companies or vendors can be supported.

SUMMARY

Systems and methods are provided to solve these and other problems and disadvantages of the prior art. A common vendor application that can be called from multiple vendor applications is loaded onto a communication device. When the common vendor application is called from an application provided by a vendor, the common vendor application sends a request to access vendor configuration information to a common vendor server. The request includes a vendor identifier that uniquely identifies the vendor. In response to receiving the request to access the vendor configuration information, the common vendor server identifies vendor configuration information for the vendor. The vendor configuration information is sent the common vendor application on the communication device. The common vendor application uses the vendor configuration information to customize the common vendor application specific to the vendor. This allows multiple vendors to use the same common vendor application, but to have a common look-and-feel. It also reduces the number of applications necessary to support multiple vendors.

DETAILED DESCRIPTION

Figure 1:
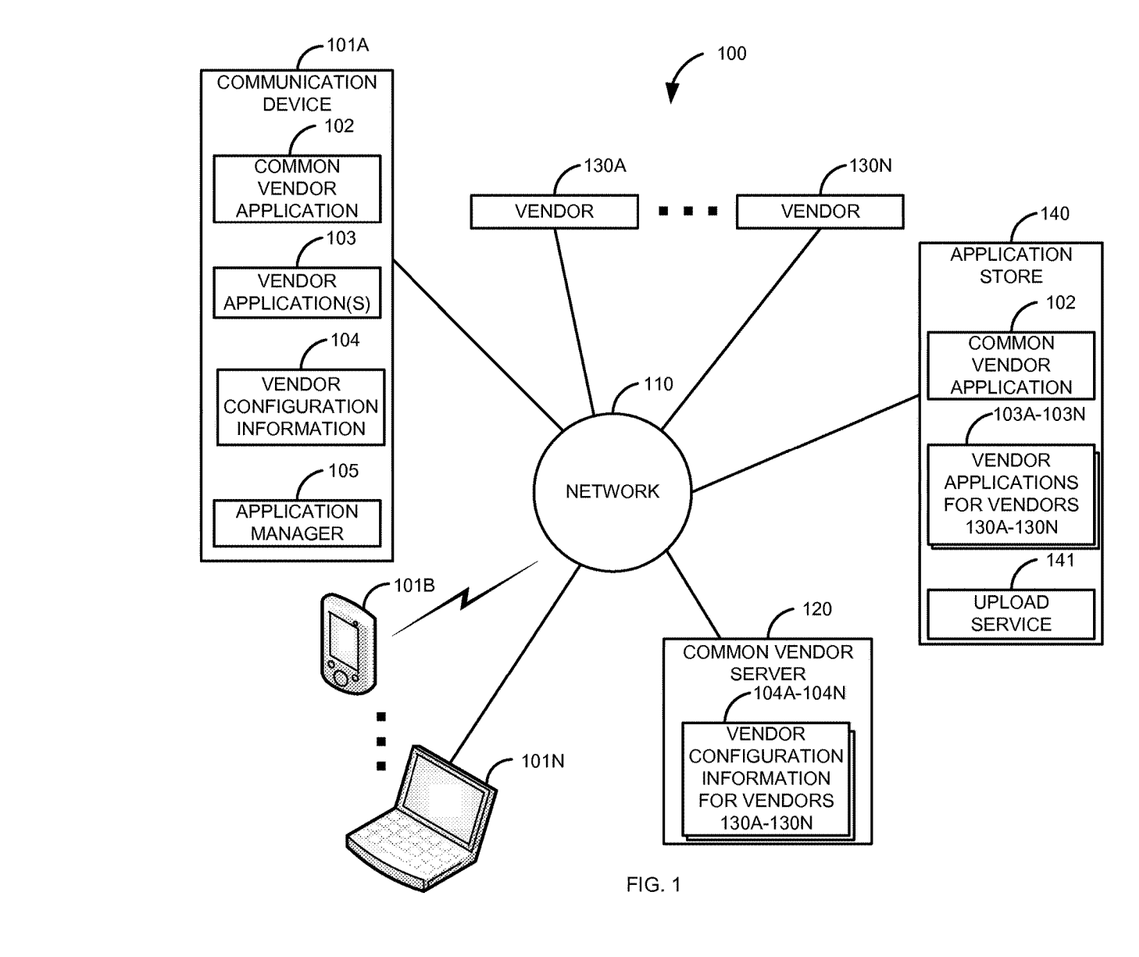
FIG. 1 is a block diagram of a first illustrative system for customization of a common vendor application based on vendor specific configuration information.

FIG. 1 is a block diagram of a first illustrative system 100 for customization of a common vendor application 102 based on vendor configuration information 104. The first illustrative system 100 comprises communication devices 101A-101N, a network 110, a common vendor server 120, vendors 130A-130N, and an application store 140.

The communication device 101 can be or may include any device that can communicate on the network 110, such as a Personal Computer (PC), a telephone, a video system, a cellular telephone, a Personal Digital Assistant (PDA), a tablet device, a notebook device, a smart phone, a server, and/or the like. As shown in FIG. 1, any number of communication devices 101A-101N may be connected to the network 110, including only a single communication device 101.

The communication device 101A further comprises a common vendor application 102, vendor application(s) 103, vendor configuration information 104, and an application manager 105. Although the communication devices 101B-101N are not shown comprising the common vendor application 102, the vendor application(s) 103, the vendor configuration information 104, and the application manager 105, each of the communication devices 101A-101N may also contain the elements 102-105.

The common vendor application 102 can be an application that can be accessed from two or more vendor applications 103, which are from different vendors 130A-130N. For example, the common vendor application 102 can be accessed by a vendor application 103A from the vendor 130A and a vendor application 103N from the vendor 130N. The common vendor application 102 can provide a variety of services, such as voice calls, video calls, text messaging services, Instant Messaging (IM) services, email services, web browsing services, call center services, communication services, collaboration services, and/or the like.

The vendor application(s) 103 can be any application that is supplied by any one of the vendors 130A-130N. The vendor application(s) 103 in the communication device 101 are typically downloaded from the application store 140. For example, a user of the communication device 101 goes to the application store 140 and downloads a vendor application 103 from a particular vendor 130 onto the communication device 101. The vendor application 103 can call the common vendor application 102 from one or more points in the vendor application 103. For example, a vendor application 103 can call the common vendor application 120 when a button is clicked and when a menu item is selected.

The vendor configuration information 104 is information that typically customizes the common vendor application 102 to have a similar look-and-feel to the vendor application 103 that calls the common vendor application 102. When the common vendor application 102 is loaded, the common vendor application 102 uses the vendor configuration information 104 (based on a vendor identifier) to customize the common vendor application 102. The look-and-feel may include logos, color schemes, window sizing, menu structure, enablement/disablement of features (e.g., via menus, buttons, tabs, etc.) and/or the like. For example, vendor 130A may have a different logo and color scheme (defined in the vendor configuration 104A for vendor 130A) than a logo and color scheme for vendor 130B (defined in the vendor configuration 104B for the vendor 130B).

The vendor configuration information 104 may also contain other information to customize the common vendor application 102. For example, if the common vendor application 102 is a call center application, the vendor configuration information 104 may include a main telephone number, an email address, and/or Instant Messaging (IM) address that are used to contact the vendor's call center.

The vendor configuration information 104 may disable or enable different functionality of the common vendor application 102. For example, the vendor configuration information 104A for the vendor 130A may enable different menus/buttons than the vendor configuration information 104B.

The application manager 105 can be or may include any hardware/software that can manage applications that are on the communication device 101. For example, the application manager 105 may be part of an operating system, such as Android™ Microsoft Windows™, iOS™, and/or the like.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), Hyper Text Transport Protocol (HTTP), and/or the like. Thus, the network 110 is an electronic communication network configured to carry messages via packets and/or circuit switched communications.

The common vendor server 120 can be or may include any server that can be configured to send vendor configuration information 104A-104N, such as a file server, a web server, a communication server, and/or the like. The common vendor server 120 further comprises the vendor configuration information 104A-104N of the vendors 130A-130N, which can comprise any number of vendor configuration information 104 ranging from 1 to N, where N is a positive integer.

The vendors 130A-130N typically represent a company, an individual person, and/or enterprise. The vendors 130A-130N can comprise any number of vendors 130 ranging from 1 to N, wherein N is a positive integer. The vendors 130 typically develop the vendor applications 103. A vendor 130 may develop more than one vendor application 103.

The application store 140 can be any kind of service that can supply applications to the communication devices 101A-101N. For example, the application store 140 may be Google Play™, the Apple™ app store, a custom application store, and/or the like. The application store 140 further comprises the common vendor application 102, the vendor applications 103A-103N from the vendors 130A-130N, and an upload service 141.

The upload service 141 can be or may include any hardware/software that can upload the common vendor application 102 and the vendor applications 103A-103N to the communication devices 101A-101N. The upload service 141 may use a variety of processes to upload the common vendor application 102/vendor applications 103A-103N.

The common vendor server 120 and the application store 140 may be part of a cloud service provided by a service provider. The service provider may offer the cloud service to users of the communication devices 101A-101N.

Figure 2:
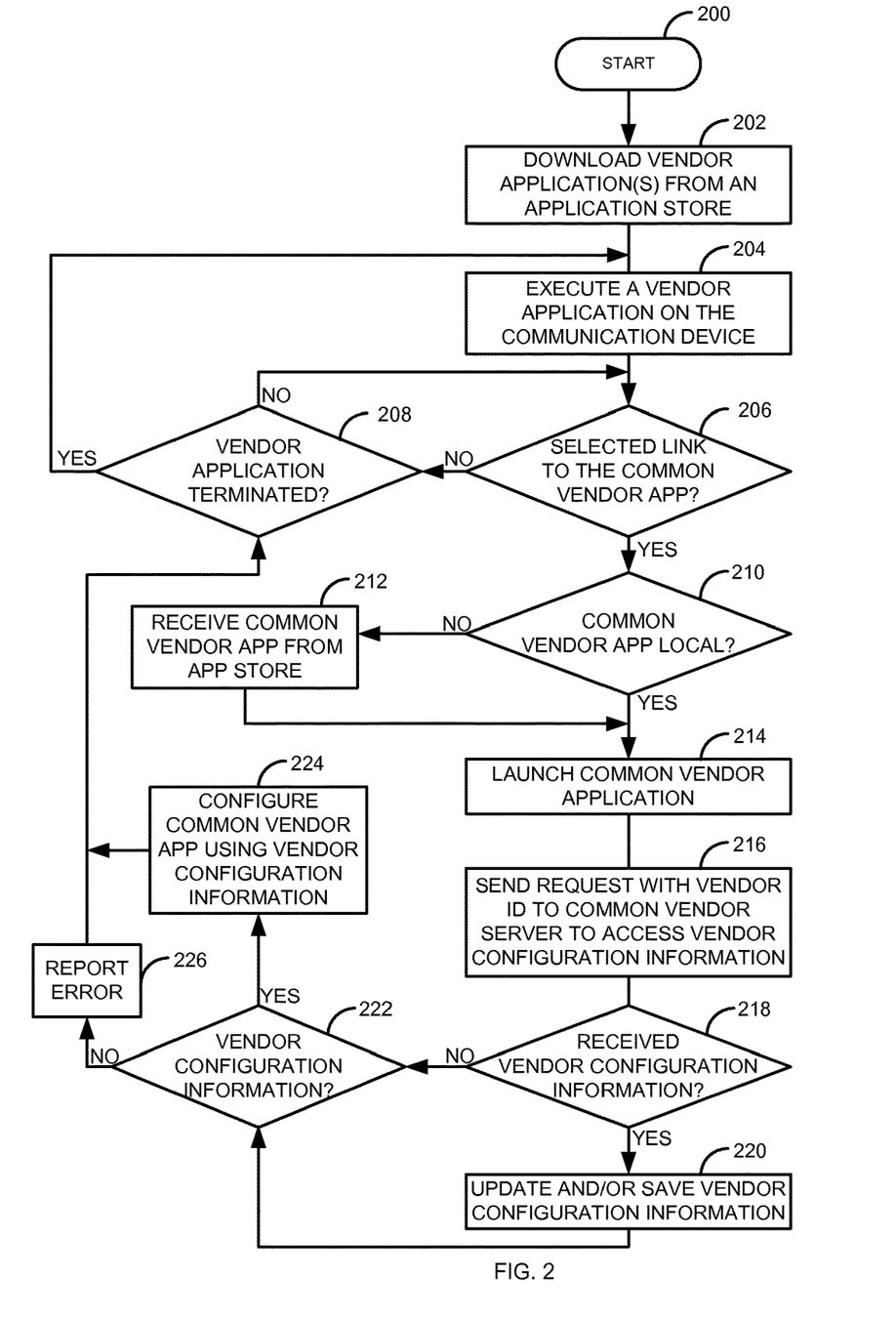
FIG. 2 is a flow diagram of a process for configuring a common vendor application using vendor configuration information.
Figure 3:
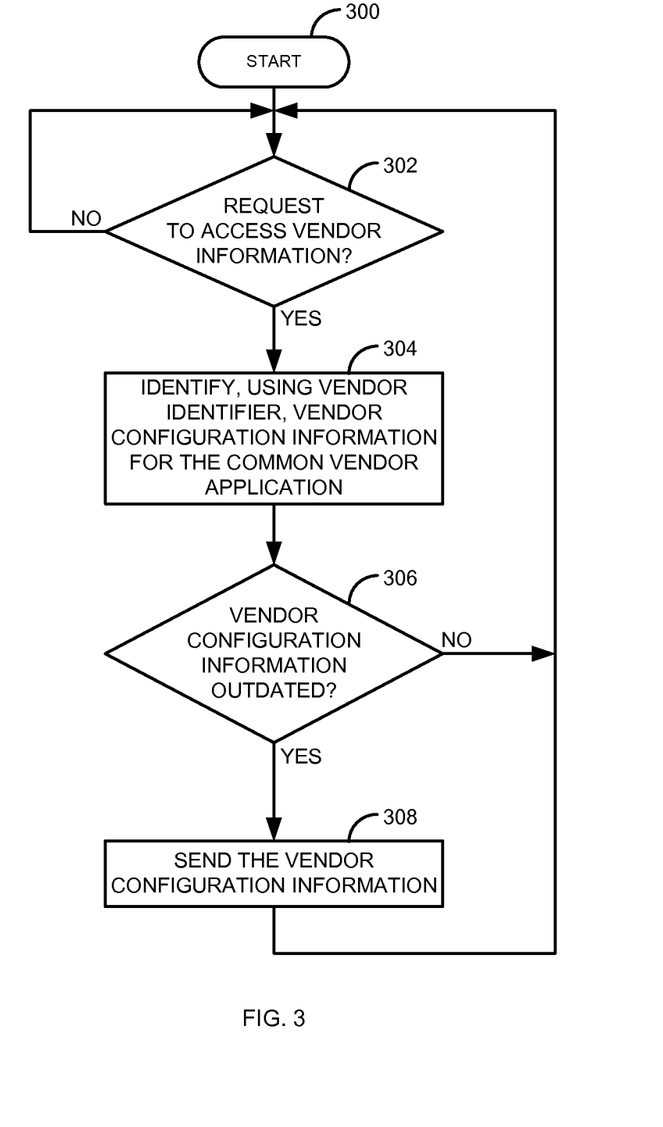
FIG. 3 is a flow diagram of a process for sending vendor configuration information to customize a common vendor application.
Figure 4:
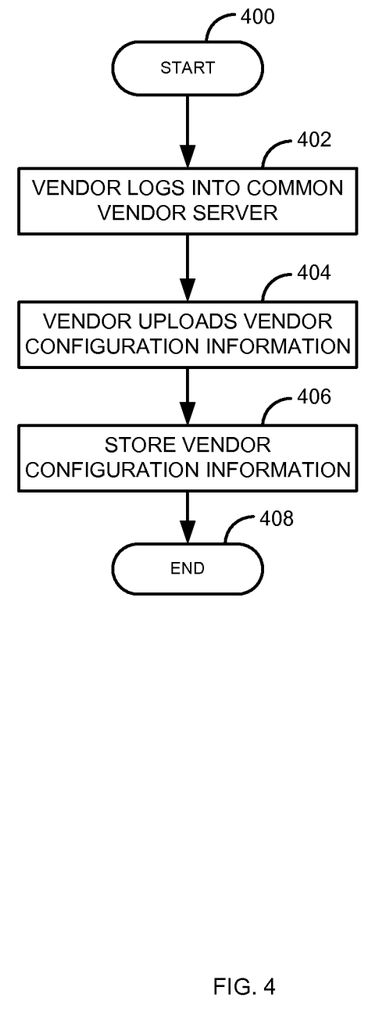
FIG. 4 is a flow diagram of a process to allow individual vendors to upload vendor configuration information to a common vendor server.

FIG. 2 is a flow diagram of a process for configuring a common vendor application 102 using vendor configuration information 104. Illustratively, the communication devices 101A-101N, the common vendor application 102, the vendor applications 103A-103N, the application manager 105, the common vendor server 120, the application store 140, and the upload service 141 are stored-program-controlled entities, such as a computer or processor, which performs the method of FIGS. 2-4 and the processes described herein by executing program instructions stored in a non-transitory computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

FIG. 2 is a flow diagram from the perspective of the communication device 101. The process starts in step 200. A user of the communication device 101 downloads one or more vendor applications 103 from the application store 140 in step 202. Although step 202 is shown before other steps, the user may download additional vendor applications 103 from the application store 140 at other times.

The user selects one of the vendor applications 103 and the vendor application 103 is executed on the communication device 101 in step 204. The vendor application 103 contains a link that launches the common vendor application 102. The link includes a vendor identifier. The vendor identifier can be any number, string, or identifier that can uniquely identify the vendor 130. The link may be based on an action, such as a button selection. For example, the vendor application 103 may have a "call me" button that sends a link to the common vendor application 102 so the user can call a contact center of the vendor 130. When the "call me" button is selected, the customer identifier is passed in the link. In one embodiment, the format of the link can be in the form of a Uniform Resource Locator (URL), such as avaya://makeCall?custID=1234567890&callee=10000@ avaya.com&uui=productA&caller=123456&type=video.

The parameter makecall is a string that is used to identify the command. In this example, the common vendor application 102 is supposed to initiate a call. The custID is the vendor identifier. This is the number that the common vendor application 102 uses to retrieve the vendor configuration information 104. The callee is a parameter that identifies an extension number that is being called. The uui parameter is User-to-User Information that is sent as part of the call. For example, the uui parameter may have information about a product or service being requested by the user of the communication device 101. The caller is the extension that making the call. The type parameter is for the type of call. In this example, the call is a video call. The type field can also be for a chat session, a screen sharing session, or an audio call. The above link is just one of many ways that information can be passed to the common vendor application 102.

If the user has not selected the link to the common vendor application 102 in step 206, the application manager 105 determines in step 208 if the vendor application 103 has been terminated. If the vendor application 103 has been terminated in step 208, the process goes back to step 204. Otherwise, if the vendor application 103 has not been terminated instep 208, the process goes back to step 206.

If the link to the common vendor application 102 has been selected in step 206, the application manager 105 determines, in step 210, if the common vendor application 102 is local to the communication device 101. If the common vendor application 102 is local (or is outdated) the application manager 105 receives the common vendor application 102 from the application store 140 (via the upload service 141) in step 212 and the process goes to step 214. Otherwise, if the common vendor application 102 is local in step 210, the process goes to step 214.

The common vendor application 102 is launched in step 214. The common vendor application 102, using the customer identifier from the link, sends, in step 216 a request with the customer identifier to the common vendor server 120 to get the vendor configuration information 104 for the vendor 130.

If the vendor configuration information 104 was received in step 218, the common vendor application 102 updates (if a prior version exists) or saves the vendor configuration information 104 in step 220 and the process goes to step 222. Otherwise, if vendor configuration information 104 is not received in step 218 (e.g., a response is sent to indicate that the current version is the latest version), the process goes to step 222.

In if there is no configuration information for the vendor 130 (e.g., the network is down and the vendor configuration information 104 cannot be retrieved) in step 222, the common vendor application 102 reports an error in step 226. In addition, the common vendor application 102 may close. The process then goes to step 208.

Otherwise, if the vendor configuration information 104 is available in step 222, the common vendor application 102 is automatically loaded, in step 224, using the vendor configuration information 104 sent by the common vendor server 120. The process then goes to step 208.

FIG. 3 is a flow diagram of a process for sending vendor configuration information 104 to customize a common vendor application 102. The process of FIG. 3 is from the perspective of the common vendor server 120. The process starts in step 300. The common vendor server 120 waits to receive a request to access vendor configuration information 104 in step 302 (the request sent in step 216 of FIG. 2). If a request has not been received in step 302, the process repeats step 302.

Otherwise, if a request to access vendor configuration information 104 is received in step 302, the common vendor server 120 identifies, using the vendor identifier in the request, vendor configuration information 104 for the common vendor application 102 in step 304. The common vendor server 120 may store the vendor configuration for each of the vendors 130A-130N in various ways. For example, there may be a file structure with a directory (named based on the vendor identifier) that has the vendor configuration information 104 for each vendor 130 in the directory. The common vendor server 120 can use the vendor identifier to find the directory with the vendor configuration information 104 associated with the vendor identifier. The vendor configuration information 104 may be in a single file or multiple files. The vendor configuration information 104 may be in a text file, an extended markup language (XML) file, a binary file, and/or the like.

In one embodiment, the request of step 302 may also have a version that the vendor configuration 104 is currently using on the communication device 101. If the request includes the version, the common vendor server 120 determines if the vendor configuration information 104 is outdated in step 306. The vendor configuration information may be outdated because the communication device 101 has an older version. This way, the vendor configuration information 104 can be changed dynamically. Alternatively, if it is the first time, the version will be outdated because the communication device 101 does not currently have the vendor configuration information 104. If the vendor configuration information 104 is not outdated in step 306, the process goes to step 302. Otherwise, if the vendor configuration information 104 is outdated in step 306, the common vendor server 120 sends the vendor configuration information 104 in step 308 and the process goes to step 302.

In one embodiment, instead of checking for a version in step 306, the common vendor server 120 always sends the vendor configuration information 104. This eliminates the need to track versions of the vendor configuration information 104.

FIG. 4 is a flow diagram of a process to allow individual vendors 130 to upload vendor configuration information 104 to a common vendor server 120. The above process assumes that each of the vendors 130 have been assigned a vendor identifier. The process starts in step 400. The vendor 130 logs into the common vendor server 120 in step 402. For example, the vendor 130 may setup a user name and password when the vendor 130 signs a developer agreement with the owner of the common vendor application 102. The vendor 130 then uploads the vendor configuration information 104 to the common vendor server 120 in step 404. The common vendor server 120 stores, in step 406, the vendor configuration information 104 in step 406. The vendor configuration information 104 may be stored in various ways. For example the vendor configuration information 104 may be stored in a directory structure based on the vendor identifier. The process ends in step 408. The above process can be repeated for each of the vendors 130A-130N.

To illustrate the processes of FIGS. 2-4, consider the following example. The vendors 130A and 130B upload their respective vendor applications 103A and 103B to the application store 140. The application store 140 also has the common vendor application 102, which was uploaded previously by the owner of the common vendor application 102. The vendors 130A and 130B login to the common vendor server 120 and upload their respective vendor configuration information 104 (e.g., as described in FIG. 4).

A user at the communication device 101 downloads the vendor applications 103A and 103B from the application store 140 in step 202. The user selects the vendor application 103A and the vendor application 103A is executed in step 204. The vendor application 103A is an application that allows the user do banking services. In the vendor application 103A is a "call me" button that allows the user to talk to an agent in a call center for the bank in regard to their bank account. The user selects the "call me" button. The vendor application 103 has a link to the common vendor application 102 with the bank's identifier in the link. The Application manager 105 sees that the link has been selected in step 206.

In response the application manager 105 determines in step 210 if the common vendor application 102 is local. The application manager 105 does not find the common vendor application 102 because this is the first time the common vendor application 102 has been called. In response, the application manager 105 receives the common vendor application 102 from the application store 140 in step 212.

The common vendor application 102 is launched in step 214. The common vendor application 102 sends a request to the common vendor server 120 with the vendor identifier for the vendor 130A in step 216. The common vendor server 120 receives the request in step 302. The common vendor server 120 identifies the vendor configuration information 104A for the vendor 130A in step 304. The common vendor server 120 sends the vendor configuration information 104A in step 308.

The common vendor application 102 receives vendor configuration information 104A in step 218. The vendor configuration information 104A is saved in step 220. The common vendor application 102 is automatically loaded using the vendor configuration information 104A for the vendor 130A instep 224. This results in the user seeing an application (the common vendor application 102) that looks like it is apart of the vendor application 103A even though it is a completely separate application from a different vendor. The user can then use the common vendor application 102 to make calls into the vendors 130A's call center.

The user then closes the vendor application 103A. The user then bring up the vendor application 103B. In this example, the vendor 130B may provide completely different services or products. For example, the vendor 130B may be a company that sells cars. The user executes the vendor application 103B (step 204) and then selects the link in step 206. In this example, the common vendor application 102 is already downloaded to the communication device 101, so step 212 will be skipped. The common vendor application 102 is launched in step 214 and the request is sent in step 216. The vendor configuration information 104B is received in step 218. The vendor configuration 104B is saved on the communication device 101 and the common vendor application 102 is automatically loaded using the vendor configuration information 104B in step 224. The user can then make call a call to the vendor 130B's call center to discuss purchasing a car.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A system comprising: a processor; and
a non-transitory computer readable medium, coupled with the processor and comprising readable and executable instructions that program the processor to execute:
a common vendor server that receives, via a network and from a communication device, a first request to access vendor configuration information from a common vendor application called by a first vendor application on the communication device, wherein the request includes a first vendor identifier, wherein the first vendor identifier uniquely identifies the first vendor from other vendors using the common vendor server, and wherein the first vendor and the other vendors are at least one of a person, an individual, a company, and an enterprise; identifies, using the first vendor identifier, first vendor configuration information for the common vendor application in response to receiving the first request to access the vendor configuration information, wherein the first vendor configuration information customizes the common vendor application specific to the first vendor; sends the first vendor configuration information to the communication device, wherein the common vendor server receives a second request to access the vendor configuration information from the common vendor application called by a second vendor application on the communication device, wherein the request includes a second vendor identifier, and wherein the second vendor application is created by a different vendor than the first vendor application; identifies, using the second vendor identifier, second vendor configuration information for the common vendor application in response to receiving the second request to access the vendor configuration information, wherein the second vendor configuration information customizes the common vendor application specific to the second vendor; and sends the second vendor configuration information to the communication device.

2. The system of claim 1, wherein the common vendor server determines if the first vendor configuration information in the communication device is outdated, wherein the first vendor configuration information is sent to the communication device to update the communication device if the first vendor configuration information in the communication device is outdated.

3. The system of claim 2, wherein the common vendor application is automatically loaded using the first vendor configuration information.

4. The system of claim 1, wherein the common vendor application is automatically loaded using the second vendor configuration information.

5. The system of claim 1, wherein the first vendor configuration information is uploaded to the common vendor server by the first vendor and wherein the second vendor configuration information is uploaded to the common vendor server by the second vendor.

6. The system of claim 1, wherein the first vendor configuration information is used to disable at least a first portion of the functionality of the common vendor application and the second vendor configuration information is used to disable a second portion of the functionality of the common vendor application, the second portion being different than the first portion.

7. The system of claim 1, wherein the first vendor application accesses the common vendor application from multiple points in the first vendor application.

8. The system of claim 1, wherein the first vendor application and the common vendor application are downloaded to the communication device from an application store.

9. The system of claim 1, wherein the first vendor configuration information customizes the common vendor application specific to the first vendor by changing a look and feel of a graphical interface on the common vendor application.

10. A method comprising:

receiving, by a processor via a network and from a communication device, a first request to access vendor configuration information from a common vendor application called from a first vendor application on the communication device, wherein the first request includes a first vendor identifier, wherein the first vendor identifier uniquely identifies the first vendor from other vendors, and wherein the first vendor and the other vendors are at least one of a person, an individual, a company, and an enterprise;

in response to receiving the first request to access the vendor configuration information, identifying, using, by the processor, the first vendor identifier, first vendor configuration information for the common vendor application, wherein the first vendor configuration information customizes the common vendor application specific to the first vendor;

sending, by the processor, the first vendor configuration information to the communication device;

receiving a second request to access the vendor configuration information from the common vendor application called from a second vendor application on the communication device, wherein the second request includes a second vendor identifier, and wherein the second vendor application is created by a different vendor than the first vendor application;

In response to receiving the second request to access the vendor configuration Information, identifying, using the second vendor identifier, second vendor configuration Information for the common vendor application, wherein the second vendor configuration Information customizes the common vendor application specific to the second vendor; and sending the second vendor configuration Information to the communication device.

11. The method of claim 10, further comprising:

determining if the first vendor configuration information in the communication device is outdated, wherein the first vendor configuration information is sent to the communication device to update the communication device if the first vendor configuration information in the communication device is outdated.

12. The method of claim 11, wherein the common vendor application is automatically loaded using the first vendor configuration information.

13. The method of claim 10, wherein the common vendor application is automatically loaded using the second vendor configuration information.

14. The method of claim 10, wherein the first vendor configuration information is uploaded to a common vendor server by the first vendor and wherein the second vendor configuration information is uploaded to the common vendor server by the second vendor.

15. The method of claim 10, wherein the first vendor configuration information is used to disable at least a first portion of the functionality of the common vendor application and the second vendor configuration information is used to disable a second portion of the functionality of the common vendor application, the second portion being different than the first portion.

16. The method of claim 10, wherein the first request is in the form of a Uniform Resource Locator (URL), wherein the URL comprises the first vendor identifier, a make call identifier, a callee identifier, a product identifier, and a communication type.

17. The method of claim 16, wherein the URL is sent in the first request when a call button in the first vendor application is selected.

18. A non-transitory computer readable medium having stored thereon instructions that, when executed, cause a processor to perform a method, the instructions comprising:

instructions to receive a first request, via a network and from a communication device, to access vendor configuration information from a common vendor application called from a first vendor application on the communication device, wherein the first request includes a first vendor identifier, wherein the first vendor identifier uniquely identifies the first vendor from other vendors, and wherein the first vendor and the other vendors are at least one of a person, an individual, a company, and an enterprise;

in response to receiving the first request to access the vendor configuration information, instructions to identify, using the first vendor identifier, first vendor configuration information for the common vendor application, wherein the first vendor configuration information customizes the common vendor application specific to the first vendor;

instructions to send the first vendor configuration information to the communication device;

instructions to receive a second request to access the vendor configuration information from the common vendor application called from a second vendor application on the communication device, wherein the second request includes a second vendor identifier, and wherein the second vendor application is created by a different vendor than the first vendor application;

in response to receiving the second request to access the vendor configuration information, instructions to identify, using the second vendor identifier, second vendor configuration information for the common vendor application, wherein the second vendor configuration information customizes the common vendor application specific to the second vendor; and instructions to send the second vendor configuration information to the communication device.

19. The system of claim 1, wherein the first request is in the form of a Uniform Resource Locator (URL), wherein the URL comprises the first vendor identifier, a make call identifier, a callee identifier, a product identifier, and a communication type.

20. The system of claim 19, wherein the URL is sent in the first request when a call button in the first vendor application is selected.

* * * * *

UNITED STATES PATENT AND TRADEMARK OFFICE
CERTIFICATE OF CORRECTION

PATENT NO. : 10,455,055 B2
APPLICATION NO. : 14/746987
DATED : October 22, 2019
INVENTOR(S) : Luciano Godoy Fagundes Page 1 of 1

It is certified that error appears in the above-identified patent and that said Letters Patent is hereby corrected as shown below:

In the Claims

At Column 9, Line 31, please delete "In" and insert --in-- therein.

At Column 9, Line 32, please delete "Information" and insert --information-- therein.

At Column 9, Line 34, please delete "Information" and insert --information-- therein.

At Column 9, Line 35, please delete "Information" and insert --information-- therein.

At Column 9, Line 38, please delete "Information" and insert --information-- therein.

Signed and Sealed this
Seventeenth Day of December, 2019

Andrei Iancu
*Director of the United States Patent and Trademark Office*